US012028439B2

(12) United States Patent
Scarpa et al.

(10) Patent No.: US 12,028,439 B2
(45) Date of Patent: *Jul. 2, 2024

(54) MAINTAINING REPEATER ACCURACY FOR SATELLITE SIGNAL DELIVERY SYSTEMS

(71) Applicant: Sirius XM Radio Inc., New York, NY (US)

(72) Inventors: Carl Scarpa, Plainsboro, NJ (US); Edward Schell, Jackson, NJ (US)

(73) Assignee: Sirius XM Radio Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,621

(22) Filed: Oct. 4, 2022

(65) Prior Publication Data

US 2023/0283450 A1 Sep. 7, 2023

Related U.S. Application Data

(63) Continuation of application No. 17/157,083, filed on Jan. 25, 2021, now Pat. No. 11,463,234, which is a continuation of application No. 16/521,880, filed on Jul. 25, 2019, now Pat. No. 10,903,974.

(60) Provisional application No. 62/703,219, filed on Jul. 25, 2018.

(51) Int. Cl.
*H03D 3/24* (2006.01)
*H04L 7/033* (2006.01)

(52) U.S. Cl.
CPC .................. *H04L 7/0331* (2013.01)

(58) Field of Classification Search
CPC ..... H04L 7/033; H04L 7/0891; H04L 7/0331; H04L 7/0037; H03L 7/093; H03L 7/087; H03L 7/099; H03L 2207/50; H03L 7/0991
USPC .......... 375/376; 455/103, 127, 307; 327/156
See application file for complete search history.

(56) References Cited

U.S. PATENT DOCUMENTS

| 5,861,842 A * | 1/1999 | Hitch ....................... G04G 7/02 455/13.2 |
| 2001/0020216 A1* | 9/2001 | Lin ......................... G01S 19/44 701/472 |
| 2011/0309871 A1* | 12/2011 | Miyahara ................ G01S 19/14 327/299 |
| 2016/0352344 A1* | 12/2016 | Maki ........................ H03L 1/04 |

* cited by examiner

*Primary Examiner* — Khai Tran
(74) *Attorney, Agent, or Firm* — Kramer Levin Naftalis & Frankel LLP

(57) ABSTRACT

Systems and methods for maintaining synchronization of repeater networks with Global Positioning System (GPS) signals using phase locked loops (PLLs) and based on generation of predicted control words for controlling local oscillator frequencies is described. The predicted control words can be generated based on performing a linear fit of control words generated over a predetermined duration of time. Phase locked loops with additional false GPS pulse identification and GPS signal loss compensation circuitry can enforce a false pulse count threshold and/or an error threshold. The additional circuitry and prediction of control words can overcome errors in GPS receiver outputs and maintain accuracy of signal timings across single frequency networks using inexpensive local oscillators.

17 Claims, 13 Drawing Sheets

MAINTAINING REPEATER ACCURACY FOR SATELLITE SIGNAL DELIVERY SYSTEMS

CROSS-REFERENCE TO RELATED APPLICATIONS

This application is a continuation of U.S. patent application Ser. No. 17/157,083, filed on Jan. 25, 2021, which is a continuation of U.S. patent application Ser. No. 16/521,880, filed on Jul. 25, 2019, which issued on Jan. 26, 2021, as U.S. Pat. No. 10,903,974 which claims the benefit of U.S. Provisional Patent Application No. 62/703,219, filed on Jul. 25, 2018, the contents of which are incorporated herein by reference in their entireties.

TECHNICAL FIELD

The present subject matter relates to maintaining timing accuracy of terrestrial repeaters during intermittent loss of satellite signal reception. Techniques using modified phase locked loop (PLL) circuitry for false Global Positioning System (GPS) pulse identification, satellite signal loss compensation, slew adjustments, delay adjustments, and rapid pulse lock-on strategies for maintaining the timing accuracy of the repeaters are described.

BACKGROUND

Satellite signal delivery systems, such as Sirius XM, can include two high power geostationary satellites facilitating telecommunication over large terrestrial zones, such as continental United States. Terrestrial receivers that form part of the satellite signal delivery system can experience degradation in signal quality received from the geostationary satellites in dense urban areas where manmade structures may impede satellite signal transmissions that rely on line-of-sight communication channels. Degradation and/or loss of satellite signal reception in such dense urban areas necessitates development of techniques for maintaining terrestrial repeater timing accuracy so as to maintain performance of the satellite signal delivery system.

A complementary ground component (CGC) signal, derived from a third party, such as a Very Small Aperture Terminal (VSAT), and/or from self-reception of Sirius XM's high band signal, can be used to complement the satellite signal in dense urban areas and minimize the degradation and/or consequences of loss of the satellite signal. The CGC signal can be a Coded Orthogonal Frequency Division Multiplexed (COFDM) signal.

A Single Frequency Network (SFN) can be used for sending the CGC signal to the receiver. The SFN needs to maintain a precise center frequency, symbol rate and/or launch timing parameters for the CGC signal for accurately complementing the satellite signal and/or minimizing consequences of disruptions in reception of the satellite signal. This can be achieved by the SFN based on using a stable reference signal, such as a Global Positioning System (GPS) signal. GPS signals provide global coverage and/or Stratum level 1 timing accuracies.

In dense urban areas, reception of GPS signals can be lost intermittently and/or over prolonged durations of time. In such scenarios, satellite signal delivery systems, such as the Sirius XM that rely on terrestrial repeaters of a SFN for broadcasting data signals, need to maintain highly accurate timing requirements to prevent degradation of signal quality delivered to users.

For example, the Sirius XM system may need to maintain a timing accuracy within approximately +/−10 Hz for a 10 MHz reference signal over a 1 hour duration for reliable signal transmissions. Considering there are $10e^6 \times 3600$ clock edges over the 1 hour duration for the 10 MHz reference signal, a timing requirement of $10/36$ Parts Per billion or approximately $1/3$ Parts Per billion accuracy is needed. Over a 24 hour duration, the 1 microsecond drift corresponds to an accuracy requirement of approximately $6.6 \times 10^{-9}$, which approaches Stratum level 2 timing accuracies of $1 \times 10^{-10}$.

Achieving the Stratum level 2 timing accuracy can be accomplished by using a local oscillator (e.g., rubidium based atomic standard) that has a hold over accuracy equal to Stratum 2 or better. Rubidium based local oscillator systems are highly expensive and undesirable to use, particularly in a high volume product.

Moreover, under adverse conditions of loss of GPS signal and/or errors in GPS receiver outputs, local oscillators with accuracy corresponding to Stratum 2 or higher, may fail to achieve synchronization of Stratum 2 or higher across the SFN. As such, there is a need to devise solutions for establishing accurate reference signals using low cost components that ignore potentially faulty information provided by the GPS receivers.

SUMMARY

In accordance with some embodiments of the present subject matter, a method for synchronizing a local reference signal with a Global Positioning System (GPS) signal is described. The synchronization can be based on detecting a plurality of timing offsets between the GPS signal and the local reference signal and generating a plurality of control words corresponding to the timing offsets. The method may estimate an amount of time during which the local reference signal was synchronized with the GPS signal and after identifying an interruption in the GPS signal, a predicted control word based on the plurality of control words and based on the amount of time satisfying a first predetermined time duration can be generated.

In some embodiments, the method includes maintaining, via a feedback path, synchronization of the local reference signal with the GPS signal based on the predicted control word. The method may include controlling a slew voltage based on the predicted control word and adjusting a frequency of the local reference signal based on the slew voltage.

In some embodiments, responsive to determining that the amount of time during which the local reference signal was synchronized with the GPS signal satisfies a second predetermined time duration less than the first predetermined time duration, the method may generate a second order estimate of the predicted control word based on the plurality of control words. The method can further maintains synchronization of the local reference signal with the GPS signal based on the second order estimate of the predicted control word. A linear curve fit can be generated based on the plurality of control words.

In some embodiments, the present subject matter provides a method for determining an absence of synchronization of the local reference signal with the GPS signal after determining an interruption in the GPS signal. The method adjusts a frequency of the local reference signal based on a most recent control word of the plurality of control words.

In some embodiments, the method maintains synchronization of the local reference signal with the GPS signal based on the adjusted frequency of the local reference signal.

In some embodiments, the present subject matter provides a system comprising a Global Positioning System (GPS) receiver configured to generate a GPS signal and a computing device configured to receive, from the GPS receiver, the GPS signal. The system can synchronize a local reference signal with the GPS signal based on a plurality of control words and determine an amount of time during which the local reference signal was synchronized with the GPS signal. After identifying an interruption in the GPS signal, the system can generate a predicted control word based on the plurality of control words and based on the amount of time satisfying a first predetermined time duration.

In accordance with some embodiments of the present subject matter, a method for synchronizing a local signal with a Global Positioning System (GPS) signal based on a plurality of control words is described. After detecting a loss of the GPS signal, the method determines that the local signal was synchronized with the GPS signal before the loss of the GPS signal, and continues to maintain synchronization between the local signal and the GPS signal based on the plurality of control words and based on adjusting a frequency of the local signal.

In some embodiments, after determining that the local signal was not synchronized with the GPS signal before the loss of the GPS signal, the method determines a most recent control word of the plurality of words and adjusts a frequency of the local signal based on the most recent control word.

In some embodiments, adjusting the frequency of the local signal can be based on determining that an amount of time corresponding to a generation of the plurality of control words satisfies a predetermined duration of time and then generating a predicted control word based on the plurality of control words.

In some embodiments, generation of the predicted control word can be based on generating a linear curve fit of the plurality of control words.

In some embodiments, adjusting the frequency of the local signal can be based on determining that an amount of time corresponding to a generation of the plurality of control words does not satisfy a predetermined duration of time and generating a second order word based on the plurality of control words, wherein the second order word comprises an average value associated with the plurality of control words. The plurality of control words can be generated based on detecting a plurality of timing offsets between the GPS signal and the local signal.

The details of one or more implementations are set forth in the accompanying drawings and the description below. Other features and advantages will be apparent from the description and drawings.

BRIEF DESCRIPTION OF THE DRAWINGS

For a fuller understanding of the inventive embodiments, reference is made to the following description taken in connection with the accompanying drawings in which.

DETAILED DESCRIPTION

Figure 1:
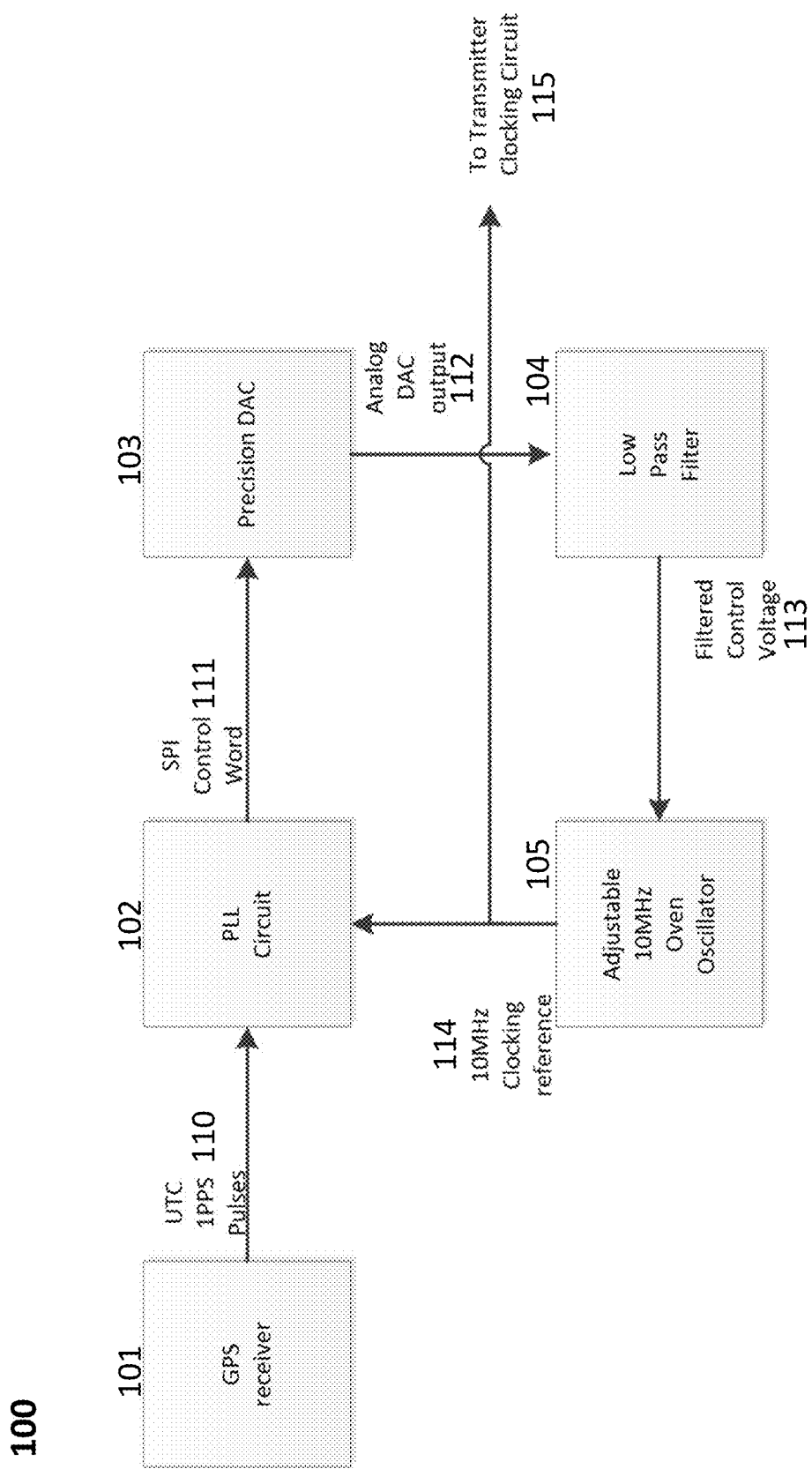
FIG. 1 shows an example use case of a phase locked loop (PLL).

As discussed above, the present subject matter is directed to methods and systems for maintaining timing accuracies of repeater stations during intermittent and/or faulty reception of GPS reference signals.

There remain a number of issues that need to be addressed to successfully achieve, and maintain, Stratum 1 timing quality at repeater stations. For example, right after the PLL circuits have been powered ON and/or initialized at the repeater station, the PLL circuits have no comparative positional and/or timing information associated with the local 1 PPS pulse train 114 and the UTC 1 PPS pulse train 110. This lack of information can result in arbitrarily large positional and/or timing errors between the local pulse train and the UTC pulse train and can lead to very long PLL lock-on times for synchronization purposes.

As another example, a feedback control loop associated with the PLL circuit 102 needs to take into account a time delay between the comparative positional and/or timing information measurement and a corrective action undertaken by the PLL circuit 102 for achieving synchronization. Adjusting the positional and/or timing of the local oscillator, via the control loop, every 1 PPS may actually extend the PLL lock-on time, as will be explained in more detail below.

As another example, application of new control voltage values to the local oscillator that cause rapid changes to the local oscillator frequency can result in a frequency shock. This can cause digital logic to not meet timing closures, resulting in logic errors in the repeater station circuits. Therefore, rapid changes to the local oscillator frequency should be avoided, particularly if high speed digital circuitry is being used.

As another example, and perhaps most critically, a GPS receiver may not always be a reliable source of accurate UTC 1 PPS pulses. Varying GPS reception conditions (e.g., due to man-made obstructions and loss of clear line-of-sight communications) can result in the GPS receiver 101 inadvertently outputting inaccurate 1 PPS pulses positioned incorrectly in time with respect to the true UTC 1 PPS pulses. For example, an industry leading GPS receiver may output 1 PPS pulses that can be off by 10's to 100's of microseconds from true UTC second marks. This degree of error leads to disastrous results for a SFN such as the Sirius XM.

Lastly, loss of GPS reception, by the GPS receiver 101, leads to loss of the UTC 1 PPS pulse train 110. Under such conditions the local oscillator 105 is expected to maintain timing accuracy of the clock reference signal 114. The subject matter disclosed herein solves each of the problems above in a simplistic and cost effective manner.

FIG. 1 shows an example block diagram 100 of a PLL circuit 102 that is connected to a GPS receiver 101, a precision digital-to-analog converter (DAC) 103, and a local oscillator 105, for generating a clock signal 115. The PLL circuit 102 receives pulses 110 from the GPS receiver 101 and compares occurrences of edge transitions of each of the pulses 110 with edge transitions of pulses of a clock reference 114 generated by the local oscillator 105. The PLL circuit 102 can align the occurrences of the edge transitions of each of the pulses 110 with the edge transitions of the clock reference 114.

The local oscillator 105 can be an oven oscillator that generates pulses, such as the 10 MHz clock reference 114, at adjustable frequencies. The comparison performed by the PLL circuit 102 can be based on comparing a position in time of a pulse 110 generated by the GPS receiver 101 with a position in time of a pulse locally generated by the local oscillator 105. The comparison performed by the PLL circuit 102 can generate a PLL output that is supplied to the precision DAC 103. The PLL output can include a Serial Peripheral Interface (SPI) control word 111 that directs the DAC 103 to generate an analog output 112 for adjusting a frequency of operation of the local oscillator 105. The SPI control word 111 can translate to an incremental control voltage varying between 0 V and 3.3 V, such as approximately 45 µV, for adjusting the frequency of operation of the local oscillator 105.

The precision DAC 103 may generate a control voltage 112 that is based on the SPI control word 111. A low-pass filter 104 uses the analog control voltage 112 generated by the precision DAC 103 to generate a filtered control voltage 113 for controlling the frequency of pulses generated by the local oscillator 105. The low-pass filter 104 can remove high frequency noise components from the control voltage 112 to generate the filtered control voltage 113.

The GPS receiver 101 may generate Coordinated Universal Time (UTC) pulses 110 with a timing of one pulse per second (1 PPS) based on a GPS reference signal. Edge transitions of the generated pulses 110 are of importance for accurately determining timing information with respect to UTC. Considering that GPS receivers can output the 1 PPS pulses with positional error variances of approximately 20-30 ns, a clock multiple of 10 can be used to generate a local oscillator frequency of 100 MHz. This provides a positional sampling resolution of approximately 10 ns, which is lower than the positional error variances of the GPS receiver. Although the local oscillator can be used for generating a higher clock rate (e.g., 100 MHz clock reference), positional measurement accuracy can be increased by applying a multiplier to the clock rate.

Figure 2:
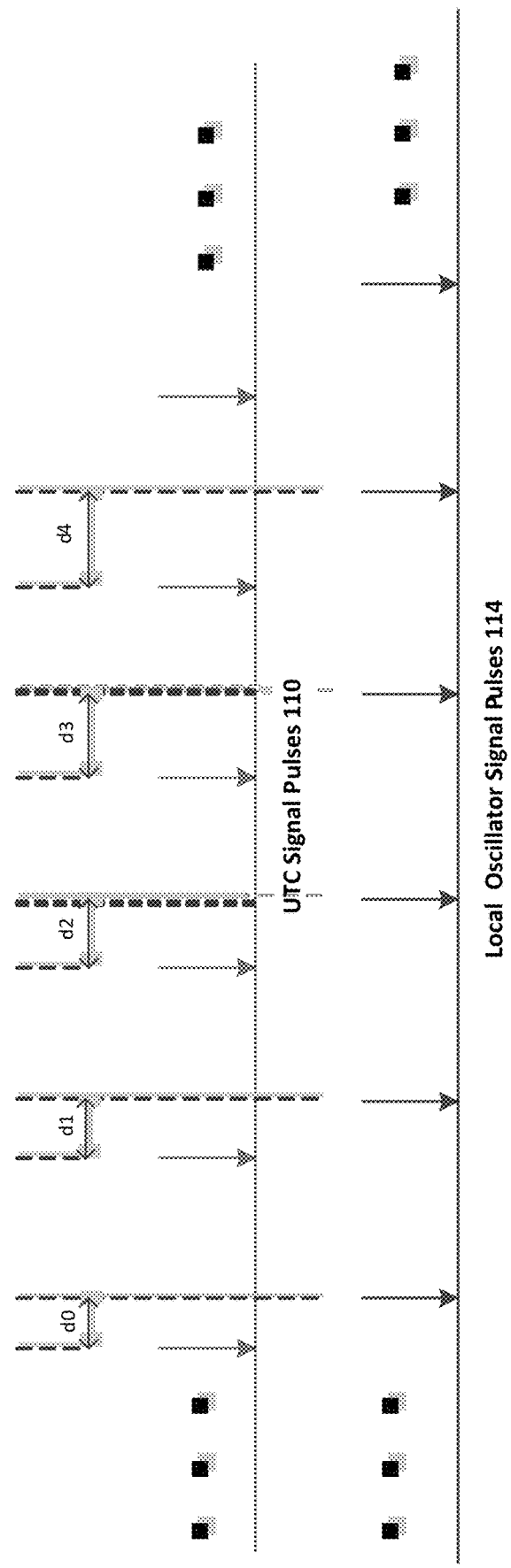
FIG. 2 shows an example of timing errors in a single frequency network (SFN).

FIG. 2 shows timing errors between the UTC 1 PPS reference signal 110 generated by the GPS receiver and the clock reference signal 114. As shown is FIG. 2, there is an initial offset error (d0), which can be measured in elapsed 100 MHz clock edges from the received UTC 1 PPS reference signal 110. Similar errors are shown to emphasize increase in timing error magnitude as the signals progress in time, for example, from d1 to d4. The PLL circuit 102 adjusts the local oscillator signal 114 to synchronize the local pulses generated by the local oscillator 105 with the pulses corresponding to the UTC 1 PPS reference signal 110.

After the local clock signal 114 pulse train is synchronized with the reference signal 110 pulse train, the local clock, such as the oscillator 114, has information regarding exact occurrence of a UTC second event. For example, after synchronizing the local pulse train with the UTC pulse train, the oscillator 114 has sufficient timing information for predicting an occurrence of a next UTC pulse. Such synchronization is necessary for maintaining signal quality transmitted via a single frequency network (SFN).

Figure 3:
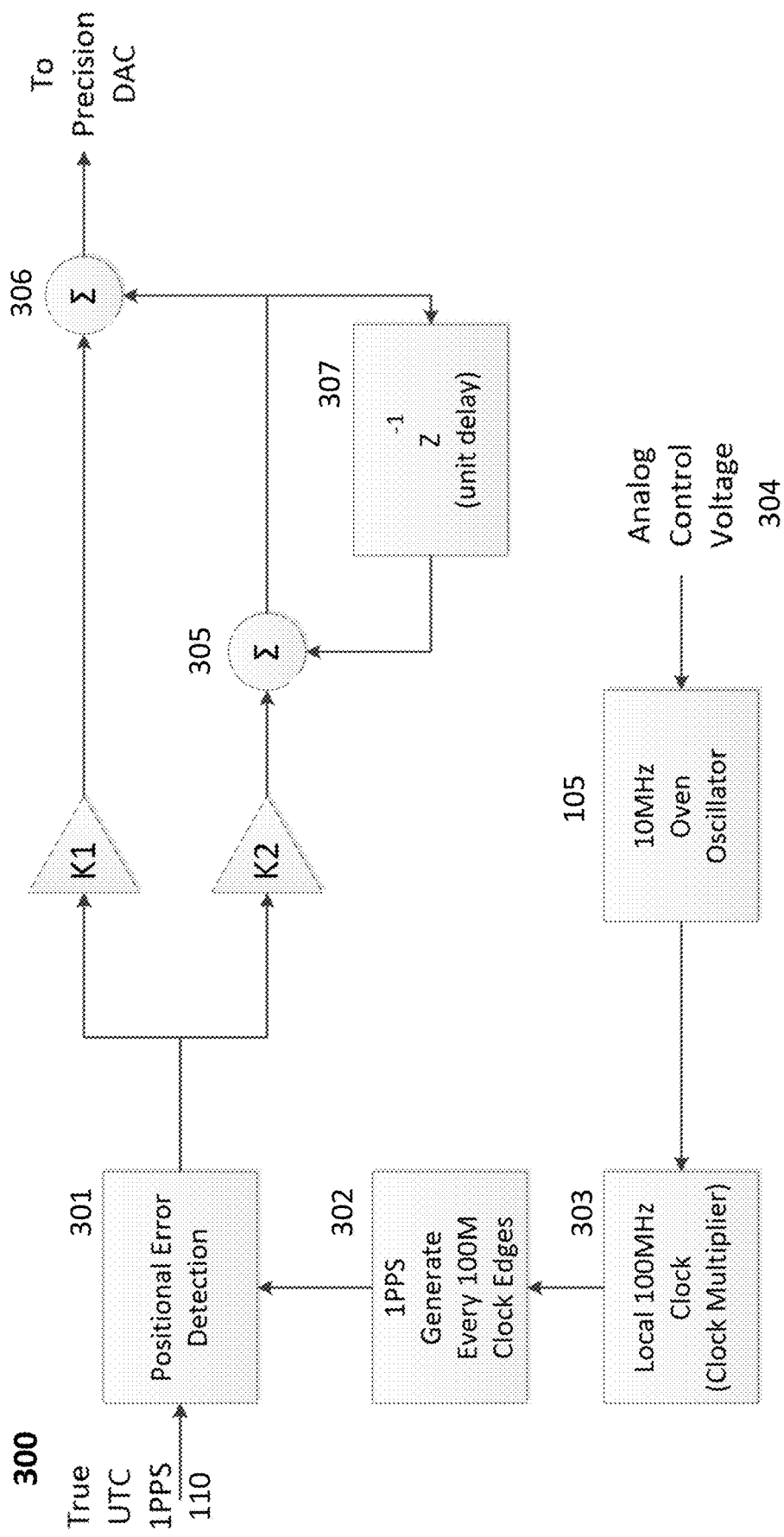
FIG. 3 shows an example of a PLL circuit with positional error detection.

FIG. 3 shows an example of a PLL circuit 300 with positional error detection circuitry 301 that continuously tracks positional errors measured between the true UTC 1 PPS 110 and the locally generated 1 PPS originating from the local oscillator 105. The positional errors may vary from $-50E^6$ to $50E^6$ based on a 100 MHz reference clock pulse train generated by a clock multiplier 303 that multiplies the local oscillator frequency by a predetermined integer value. The measured positional errors can be supplied to a proportional plus integral feedback control loop that generates control word values sent to the precision DAC. For example, the proportional plus integral feedback control loop can apply proportional coefficient K1 and integral coefficient K2, and include unit delay circuitry 307. With judicious selection of K1 and K2 values, the feedback control loop can typically reach convergence and the positional errors can remain near zero indefinitely.

Figure 4:
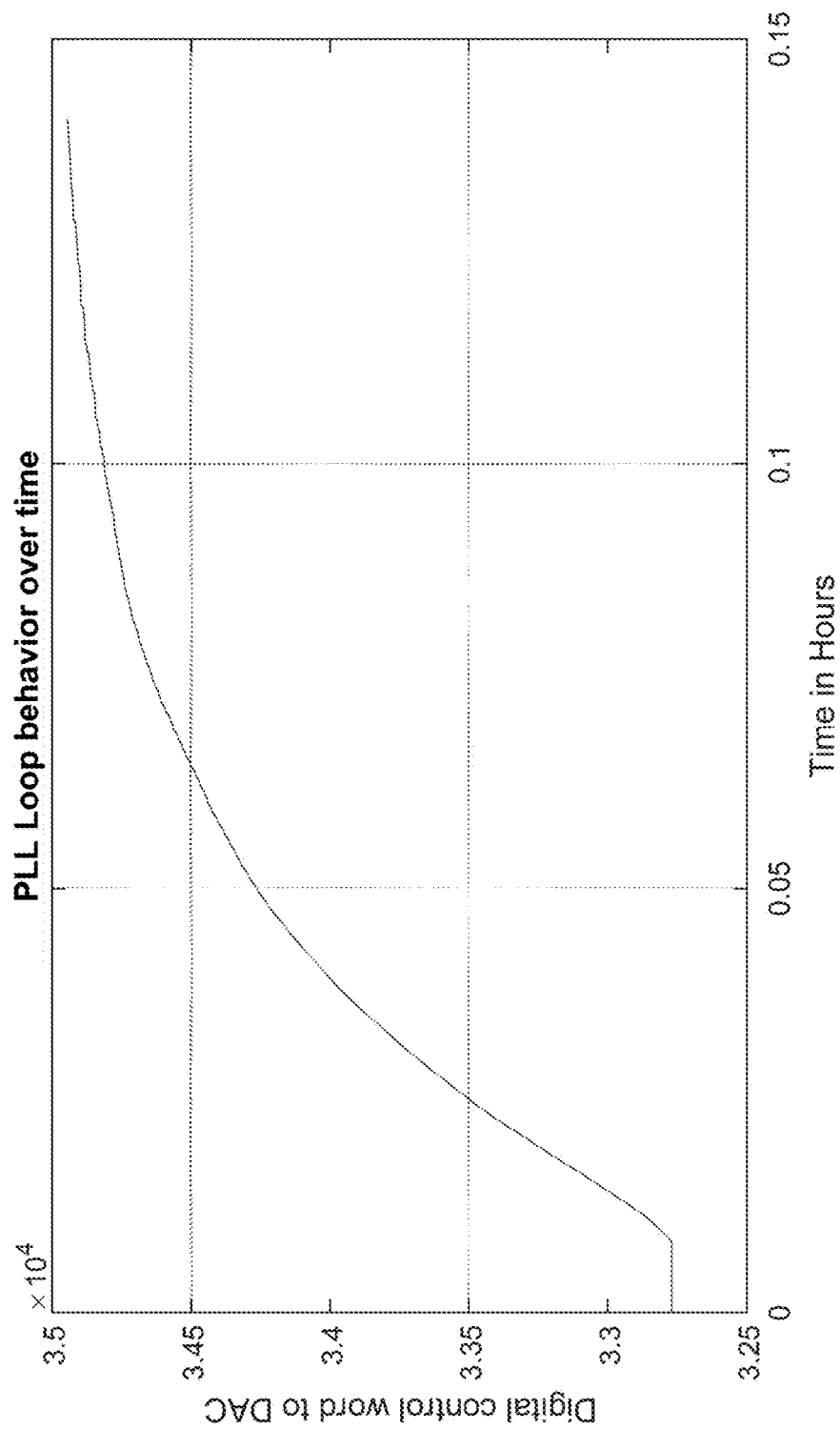
FIG. 4 shows an example of variations in control word values over time for a PLL circuit.

FIG. 4 Using appropriate loop gains (K1 & K2), the convergence of such a loop can be illustrated in the next two figures. FIG. 4 depicts a cold, intentionally under-damped startup condition. This is a typical power on scenario where there is no knowledge of UTC alignment and the oven is heating to its normal operational temperature (typically around 75 C). After approximately ¹⁄₁₀ of an hour, the control voltage begins to level out, indicating one is close to frequency/phase lock to the UTC pulse train.

Figure 5:
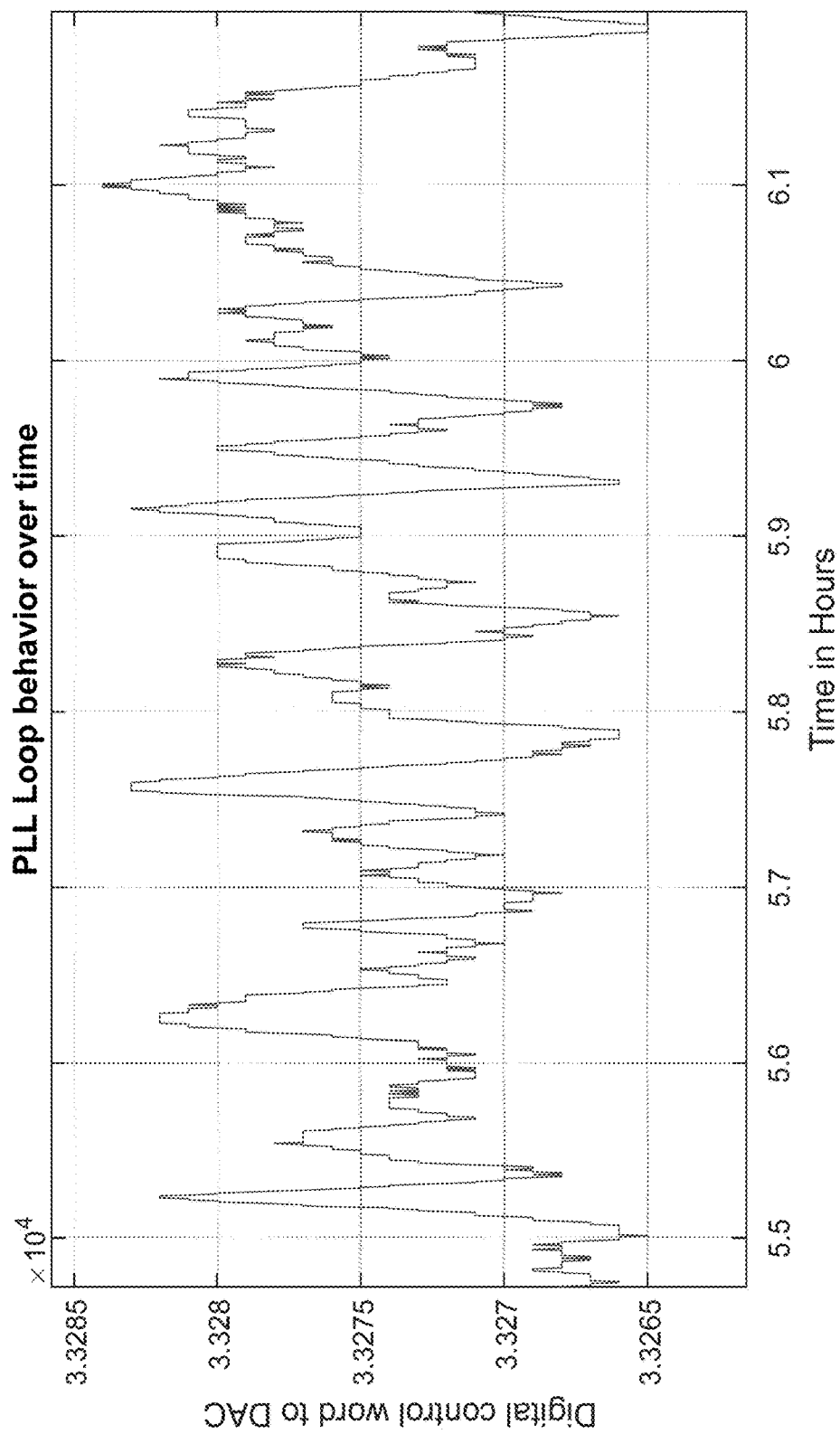
FIG. 5 shows an example of variations in control word values over time for a PLL circuit with fine frequency adjustments.

FIG. 5 shows a short time snippet of variations in control word values of the PLL circuit over time. Over this short time snippet, the local oscillator 105 is locked-onto the GPS UTC signal. The local oscillator 105 can be an oven-controlled crystal oscillator (OCXO) with a control voltage range of +/−1.5 V. The fluctuations in control word values can be a result of the feedback control loop following outside influences, such as inherent positional errors introduced by the GPS receiver of approximately +/−20-30 ns and the ambient and/or oven temperature fluctuations experienced by the local oscillator 105. The plot in FIG. 5 depicts the PLL circuit maintaining stratum level 1 timing quality. Such performance will continue indefinitely, provided the GPS signal is present.

It can be noted that the variations in the control word values shown in FIG. 5 correspond to extremely fine frequency adjustments to the local oscillator 105. The precision DAC analog output 112 may cover a digital control range of approximately +/−32768. A typical OCXO may pull +/−1 PPM over the full control voltage translating to an incremental frequency adjustment of approximately ¹⁄₃₂ parts per billion. Using a standard 10 MHz OCXO this translates to incremental adjustments of 0.0003 Hz. The digital control words can be cyclic, with a peak to peak range of about 15 control words, which implies a tracking adjustment to maintain stratum level 1 timing quality of approximately +/−2 mHz.

Figure 6:
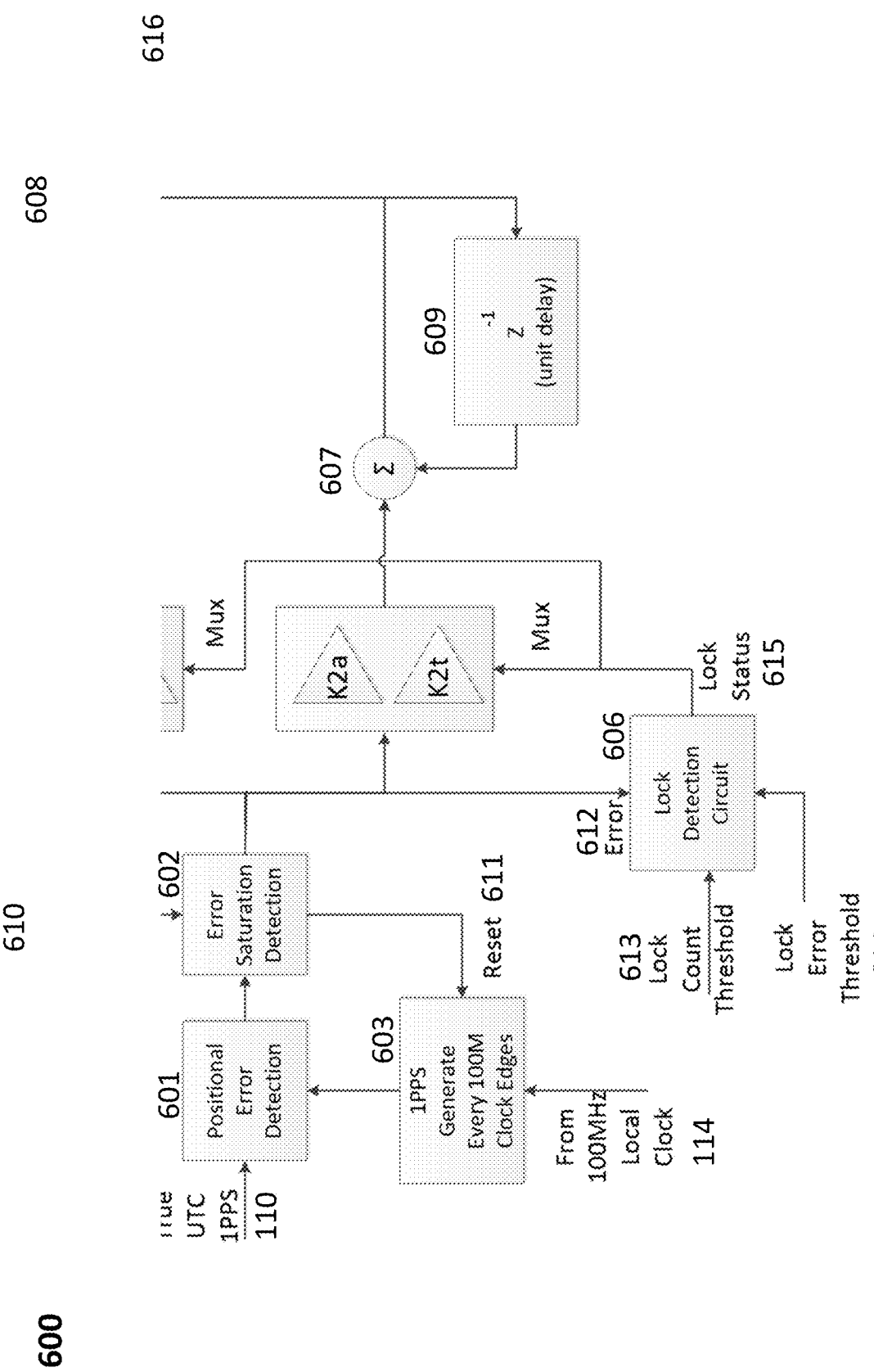
FIG. 6 shows an example of a PLL circuit implementation with saturation detection and gear shifting.

FIG. 6 shows an example of a PLL circuit implementation 600 with saturation detection for rapid synchronization of a local oscillator pulse train with the true UTC pulse train 110. Upon power up of the circuit 600, a local oscillator (e.g., the OCXO) will typically provide the reference signal. The reference signal pulses can be arbitrarily off in time with respect to the UTC pulse train because on power-up, the local oscillator would not be synchronized with the UTC pulse train. An initial phase offset between the reference signal pulses and the UTC pulse train can correspond to approximately +/−50 million clock edges.

As the PLL circuit 600 is not locked to the GPS reference signal generated by a GPS receiver providing the true UTC pulse train 110, a first step to enable quick lock-on is to include a saturation counter. The saturation counter can be incremented whenever a measured positional error exceeds a predefined error saturation threshold. The measured positional error can be based on a timing comparison of clock edges of the UTC pulse train with clock edges of the local oscillator clock signal.

While incrementing a count of the saturation counter, if large errors are measured, the local oscillator may be too far off in timing accuracy to be pulled to synchronization in a timely manner. The large error measured can be zeroed, prohibiting the PLL circuit 600 from making any adjustments. After a predefined saturation count threshold 610, the PLL circuit 600 forces a reset 611 of its local counters 603 to start counting on the very next UTC 1 PPS pulse. This process will continue to occur until the local oscillator is fairly close to a desired pulse rate, such as 10 MHz. This is particularly helpful during a cold start up, wherein the local oscillator is considerably off in pulse frequency and an oven associated with the local oscillator is heating to a desired operating temperature (e.g., approximately 75° C.). This approach allows for far faster GPS synchronization than methods provided by past equipment vendors. For example, synchronization of the local oscillator pulse train with the UTC pulse train may require 10 minutes as compared to 30 minutes or longer without the implementation of the saturation counter and predetermined error thresholds.

The error saturation detector 602 continuously monitors the error and increments its counter if the error threshold is exceeded. If the saturation count threshold 610 is reached after consecutively large errors have been detected, a reset 611 to the locally generated pulse train is performed. This is a major event that needs to be detected to halt transmission of signals, as it indicates an incorrect timing relationship to the GPS reference signal. Under normal operation the saturation detection circuit should only need to operate after a hardware reset event.

As part of the rapid lock-on strategy, the PLL circuit 600 takes advantage of a gear shifting policy. To avoid excessive clock chatter, it is desirable to use PLL gains as low as possible, provided one can continue to follow variances due to GPS positional error, oven temperature variation that can cause oscillator frequency variations, ambient temperature drift and so on. Unfortunately, using minimal gains will prolong the initial lock on time to GPS. A compromise is to use a set of acquisition gains, such as (K1a and K2a), larger than a set of tracking gains, such as (K1t and K2t), shown in FIG. 6. For example, the set of acquisition gains, (K1a and K2a), can be larger than the set of tracking gains (K1t and K2t) by a factor varying between approximately 10 to 1000.

Tracking gains are only used after the local oscillator is sufficiently close to the true UTC 1 PPS time pulses. This is determined by comparing arrival of pulses from the GPS receiver with the pulses locally generated by the local oscillator. If both phase and frequency lock have been achieved, the error difference between these two pulse trains will consistently be near zero. A lock detection circuit 606 is used to count a number of consecutive times an absolute differential error is below a threshold (e.g., lock error threshold). If the count equals or exceeds a second threshold (e.g., lock count threshold), phase lock is declared. Once lock is established, the PLL gains can be switched from the larger acquisition gains, to the smaller tracking gains Both sets of gains can be chosen to ensure feedback control loop stability.

Figure 7:
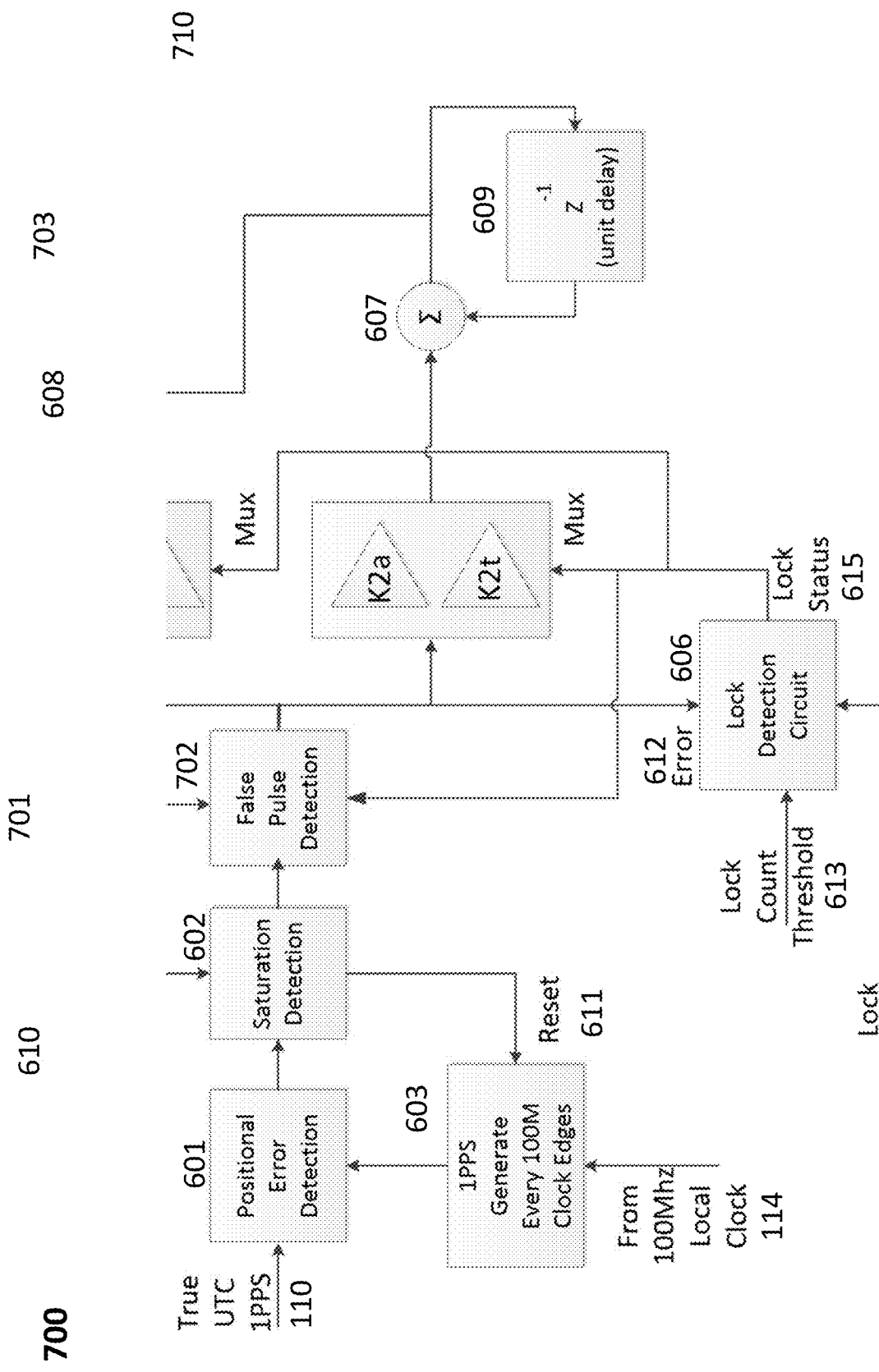
FIG. 7 shows an exemplary PLL circuit implementation with false reference pulse detection and slew control.

FIG. 7 shows an example implementation of a PLL circuit 400 with additional circuitry to implement control voltage slewing and false pulse avoidance. It is highly undesirable to move a local oscillator's frequency in large quantized jumps because the large quantized jumps can cause oscillator "shock." Oscillator "shock" leads to asymmetrical clock edge spacing which is not desirable in modern digital logic design. The asymmetrical clock edge spacing and/or large changes in the local clock frequency can lead to violations in expected timing relationships, which in turn can lead to metastability and ultimately degrade the circuit performance. This problem can be avoided by slowly changing the control voltage to gradually approach new control settings by slewing the control voltage in FIG. 7 from its last value to its new setting using smallest possible incremental steps. The smallest increment possible is dictated by a resolution of the DAC used. High precision DACs typically use 16 bit or higher precision, which can be typically scaled to provide an external control voltage swing of 3 Volts. Single digit increments of the control word can be the smallest possible steps. Larger variations from the previous control word to a current control word value will require a longer slew time. This action is desired, as large frequency deltas can be forced to be adjusted over proportionally longer intervals. Incremental slewing always guarantees a constant voltage rate of change, avoiding violating digital timing closure requirements.

Slewing a control voltage can require an appreciable amount of time for the control voltage to reach a final desired value. For example, slewing the control voltage may require milliseconds of time, as opposed to an instantaneous jump. During this slew period, the local oscillator is adjusting its frequency in response to the changing control voltage. The adjustments to the local oscillator frequency influence a difference in arrival time between the GPS 1 PPS and the locally generated 1 PPS. Therefore, varying frequency values of the local oscillator during the slew period should not be measured and/or stored for estimating a next slew control voltage. Local oscillator frequencies can be measured after the local oscillator has reached a new steady state value (e.g., an adjusted steady-state frequency). According to an exemplary aspect of the invention, the subject matter disclosed herein implements a delayed PLL for introducing a delay in local oscillator frequency measurements over the slew period.

After adjustments to the local oscillator frequency are made, a difference between the next two pulse trains is observed (e.g., a difference in arrival of a next pulse between the local 1 PPS and the true 1 UTC PPS can be measured). A new control word is generated and the PLL slews to this new value. This procedure can be repeated indefinitely, producing a measurement error and the PLL is updated every two seconds avoiding incorrect measurement differences while the slewing process is taking place.

One of the most troublesome aspects of synchronizing to a GPS receiver is handling pulses that may be appreciably offset from the true UTC second mark. Many applications can accommodate a GPS receiver that provides a 1 PPS pulse off by microseconds or possibly even milliseconds. In many applications, as in the Sirius XM SFN network, GPS pulses must occur within 10's of nanoseconds from true UTC time marks. Even best in class GPS receivers cannot guarantee such small positional errors under all operating conditions. The potential for faulty GPS receiver operation must be accommodated in the PLL circuit design.

As discussed earlier, during initial signal acquisition, large positional errors detected by the positional error detector can be discarded. As the PLL finally achieves an initial lock on the GPS signal, under proper GPS and PLL operation, subsequent large errors should no longer be present. Once the PLL locks onto the GPS signal and successfully tracks frequency deviations, subsequent errors detected are typically very small. For example, subsequent errors detected can be less than 8 clock edges for a 100 MHz clock frequency and less than 511 for saturation detection.

Similar to the saturation detector 602, a false pulse threshold and false pulse count 701 can be provided as inputs to the false pulse detection circuit 702. The false pulse detection circuit 702 differs from the saturation detector 602 in that it is only operational after the PLL has achieved lock status with the GPS signal. If during lock, an error larger than the false error threshold is detected, the error is ignored (zeroed) and a counter is incremented. If at any time the error is less than the threshold, the counter is reset to zero. If consecutive false pulses are detected, and the false count threshold is reached, the circuit may declare that these pulses have enough consistency to be deemed correct and can be subsequently used. Unlike the saturation detector 602, with a much larger set threshold, no resetting of the PLL occurs. The PLL attempts to use such pulses to achieve synchronization. This algorithm has proven to be very effective in handling arbitrarily large, erroneous 1 PPS pulses generated by the GPS receiver.

Figure 8:
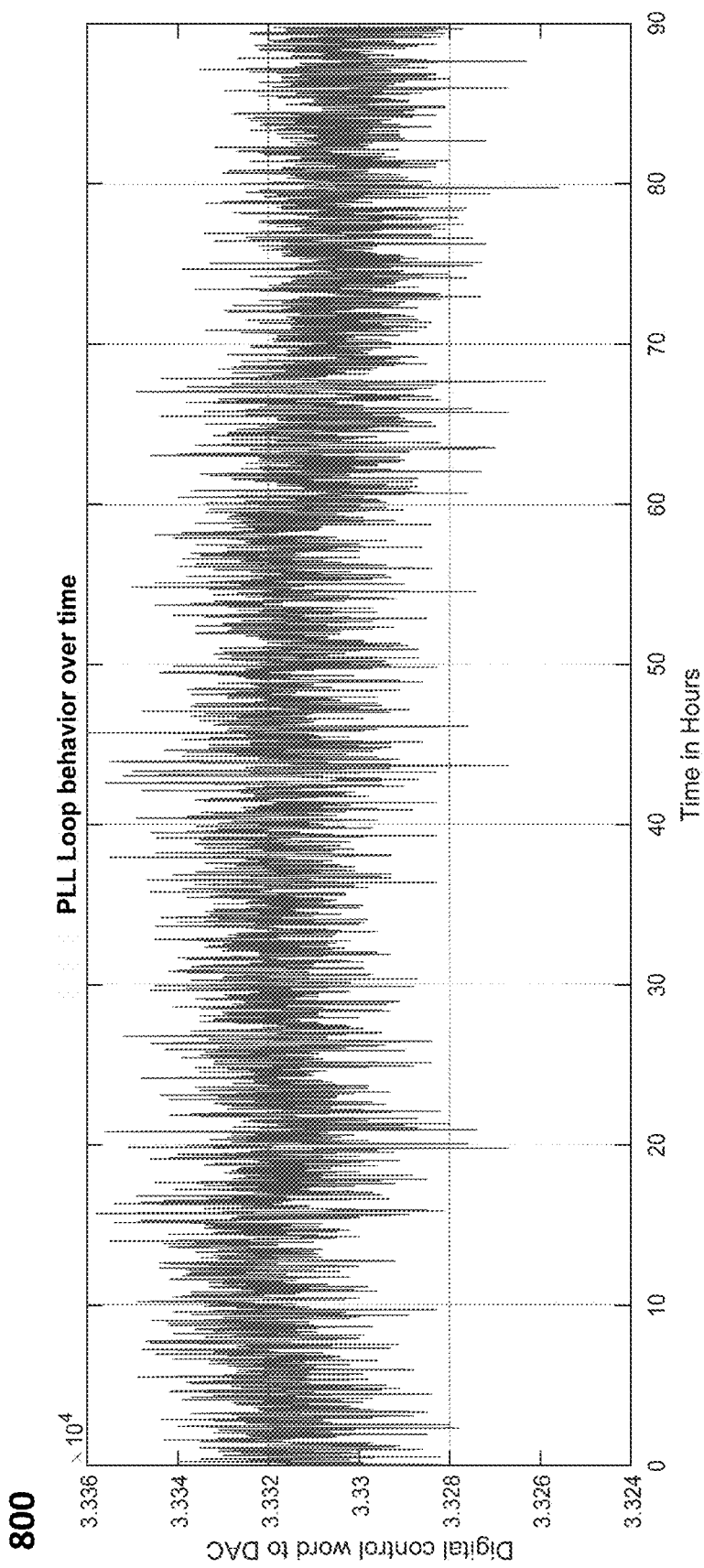
FIG. 8 shows an example of PLL digital control word variations with time.

FIG. 8 shows PLL digital control word variations with time. Low power Sirius XM repeaters can be placed close to ground level. Unfortunately such placement is not optimal for GPS reception. In dense urban environments large man-made objects present the possibility of highly attenuating and at times, completely preventing GPS signal reception. During GPS signal outage, the Sirius XM repeater is expected to continue operation for a minimum of 1 hour, maintaining tight timing accuracy. The Sirius XM requirement is to maintain a timing accuracy with maximum drift of 1 us in 1 hour. This is near stratum 2 timing quality. An exemplary solution to this problem can be to utilize a local oscillator that is rated at stratum 2 quality. Unfortunately, this calls for the usage of extremely expensive components. The method described herein avoids use of expensive components, utilizing lower cost oscillators (e.g., stratum 3 or lower), while maintaining the Sirius XM timing requirements.

Typical oscillators, such as the OCXO, maintain long-term temperature stability, varying only slightly over time. To maintain stratum level 1 timing quality, short term fluctuations in the frequencies generated by the oscillators need to be tracked and/or fine voltage control of the oscillator may be needed. To maintain stratum level 2 timing quality, short term fluctuations in the oscillator frequencies need not be tracked and therefore, fine voltage control is not required. If examined over a long time period, typical oscillators tend to have small drifts in mean center frequencies. For example, FIG. 8 depicts an OCXO operating continuously over 90 hours while tracking a GPS signal generated by the GPS receiver. The mean value of the curve is seen to change slowly over the long time period. This fact can be exploited if GPS reception is lost for a significant period of time.

An exemplary approach taken to compensate for long GPS outages can be to develop a prediction control voltage based on an oscillator's long term stability of locally generated pulse trains. Generally, oscillators exhibit a fairly linear control voltage trend over time. Therefore, past control voltage information can be used to formulate a simple y=mx+b linear curve fit that may closely follows the oscillator's behavior (e.g., local oscillator frequency) over time.

Low pass filtering of data corresponding to the curve in FIG. 5, may show that the oscillator behavior (e.g., oscillator frequency) remains fairly linear over prolonged time durations (e.g., over approximately 10 hour periods). For example, there may be no noticeable rapid rate of change of oscillator frequency over such long time durations that can span several hours. To approximate a linear curve fit for this behavior, control voltages can be averaged over approximately ½ hour durations. For example, each ½ hour average can be entered into a table until several measurements (e.g., eight) are accumulated. More measurements (e.g., over eight) can be averaged for greater precision. According to an exemplary aspect of this invention, eight measurements have been found to provide sufficient stratum level 2 timing accuracies. The eight measurements represent control voltage values over a first predetermined total time duration of 4 hours. Using the eight measurements (e.g., comprising data pairs of a respective time position and an average value), a least squares, linear fit to the data can be calculated by using equation (1) reproduced below:

$$M = \frac{n*\sum x*y - (\sum x)*(\sum y)}{n*\sum x^2 - (\sum x)^2} \quad (1)$$

$$b = \frac{(\sum x^2)*(\sum y) - (\sum x)*(\sum x*y)}{n*\sum x^2 - (\sum x)^2}$$

wherein, M and b correspond to slope and intercept respectively of a general linear equation Y=Mx+bx that represents a running count of a number of measurement averages used, ranging from 1 to n, where n is an integer whole number corresponding to a number of averaged measurements (e.g., eight measurements).

Equation (1) can be simplified based on determining the number of averaged measurements (e.g., number of data pairs). For example, for data pairs n=8, the equation (1) simplifies to:

$$M = \frac{\sum x*y}{12} - \frac{\sum y}{42} \quad (2)$$

$$b = \frac{\sum y}{2.4} - \frac{\sum x*y}{12}$$

This simplification to the equation (2) lends itself to straightforward hardware and/or processor based implementation as described below with respect to FIG. 9. Hardware and/or processor based implementations can be carried out by any type of computing device configured for wired and/or wireless networked communications. Examples of such devices include desktop computing devices, hand-held computing devices, servers, gateways, data storage devices, mobile cellular telephones, and network-enabled objects that form part of the "Internet of Things."

Figure 9:
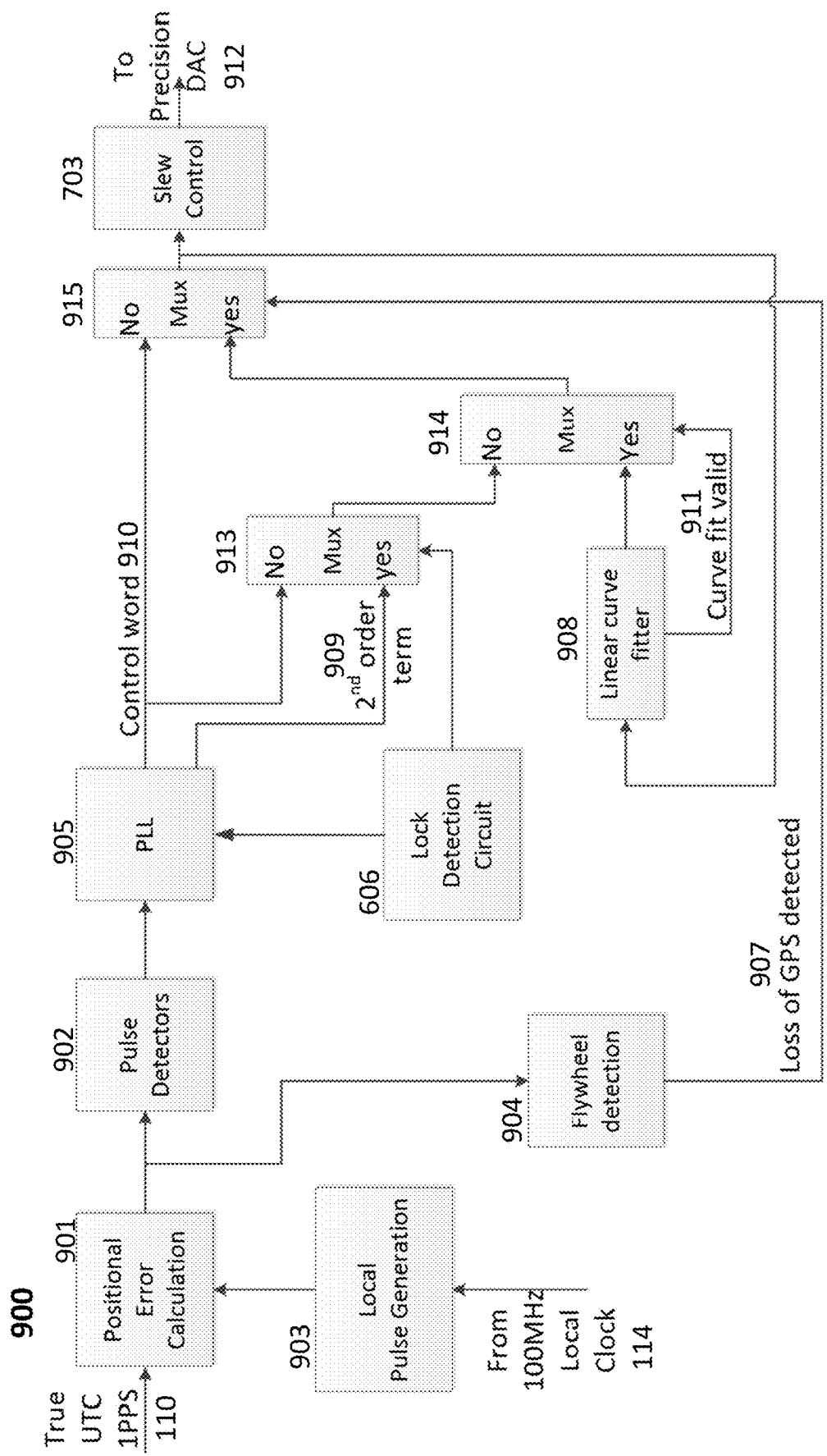
FIG. 9 shows an exemplary PLL circuit with prediction control logic.

FIG. 9 shows a PLL circuit with prediction control logic 900. If the GPS signal is lost, a flywheel detection circuit 904 determines absence of the GPS signal and triggers a corresponding loss of GPS signal 907. This can cause the circuit 900 to use predicted control words for implementing slew control via multiplexers (MUXs) 913, 914 and 915, and the slew control circuit 703. The predicted control words can be generated based on a linear curve fitter 908 that uses past control voltage information (e.g., control word 710) to generate a linear curve fit based on the equation y=mx+b for closely following the oscillator's behavior over time, as described earlier with respect to FIG. 8.

While GPS signal reception is uninterrupted, the flywheel detection circuit 904 does not trigger the loss of GPS signal 907 and the MUX 915 uses a currently generated control word, such as the control word 910 at first terminal No, as an input to the slew control circuit 703.

If the GPS signal is lost before the circuit 900 has locked-onto and/or synchronized with the GPS signal, the loss of GPS signal 907 triggered by the flywheel detection circuit 904 causes the MUX 915 to use an input signal at second terminal Yes, comprising a most recently generated control word. The most recently generated control word is then sent as an input to the slew control circuit 703 for slewing the control voltages of the local oscillator.

If the GPS signal is lost after the circuit 900 has locked-onto and/or synchronized with the GPS signal, the MUX 915 can use an input signal at the second terminal Yes, comprising a second order term 909, generated by the PLL 905, as an input to the prediction control logic via the MUX 914. The second order term 909 is then used to determine a control voltage value that is provided to the slew control circuitry 703. The second order term 909 can be an output of the PLL 905 when no input is applied to the PLL 905. A value of the second order term 909 can be based on an average of past positional errors scaled by the integral term K2, shown in FIG. 3.

Moreover, special care should be taken when insufficient data has been collected over a time duration that is less than the first predetermined time duration (e.g., less than 4 hours). For example, if data has been collected for less than 4 hours of operation and/or a second predetermined time duration (e.g., more than 1 hour but less than 4 hours), a predicted control voltage value may be inaccurate. As another example, if the GPS signal is lost before sufficient data has been collected over the first predetermined time duration (e.g., 4 hours and/or 8 measurements have been averaged), and the PLL 905 has not locked-onto the GPS signal, the PLL 605 can avoid using control voltage values generated by the predictor control logic, such as by the linear curve fitter 908 and the MUX 914.

In such instances, the PLL 905 may use either a most recently generated control word or the PLL's second order estimate of the control voltage value, such as the second order term 909. The second order term 909 can be an input to the MUX 913. A linear curve fit generated by the linear curve fitter 908 would not be valid when insufficient data is collected and the second order term 909, outputted from MUX 913, would be selected by the MUX 914 for transport to the MUX 915 and thereafter, to the slew control circuit 703.

If sufficient data has been collected (e.g., over the first predetermined time duration and eight or more measurements have been averaged), a valid curve fit signal 911 can be triggered causing the MUX 914 to use an input from the linear curve fitter 908. A currently predicted control voltage value can then be fed back into the predictor control logic. Excellent hold over performance for the circuit 900 over many hours of operation and in spite of intermittent GPS signal reception can be achieved by taking into account a state of the circuit 900 (e.g., if the circuit 900 has locked-on to the GPS signal frequency, an amount of time over which the data has been collected and a number of measurements that have been recorded).

Figure 10:
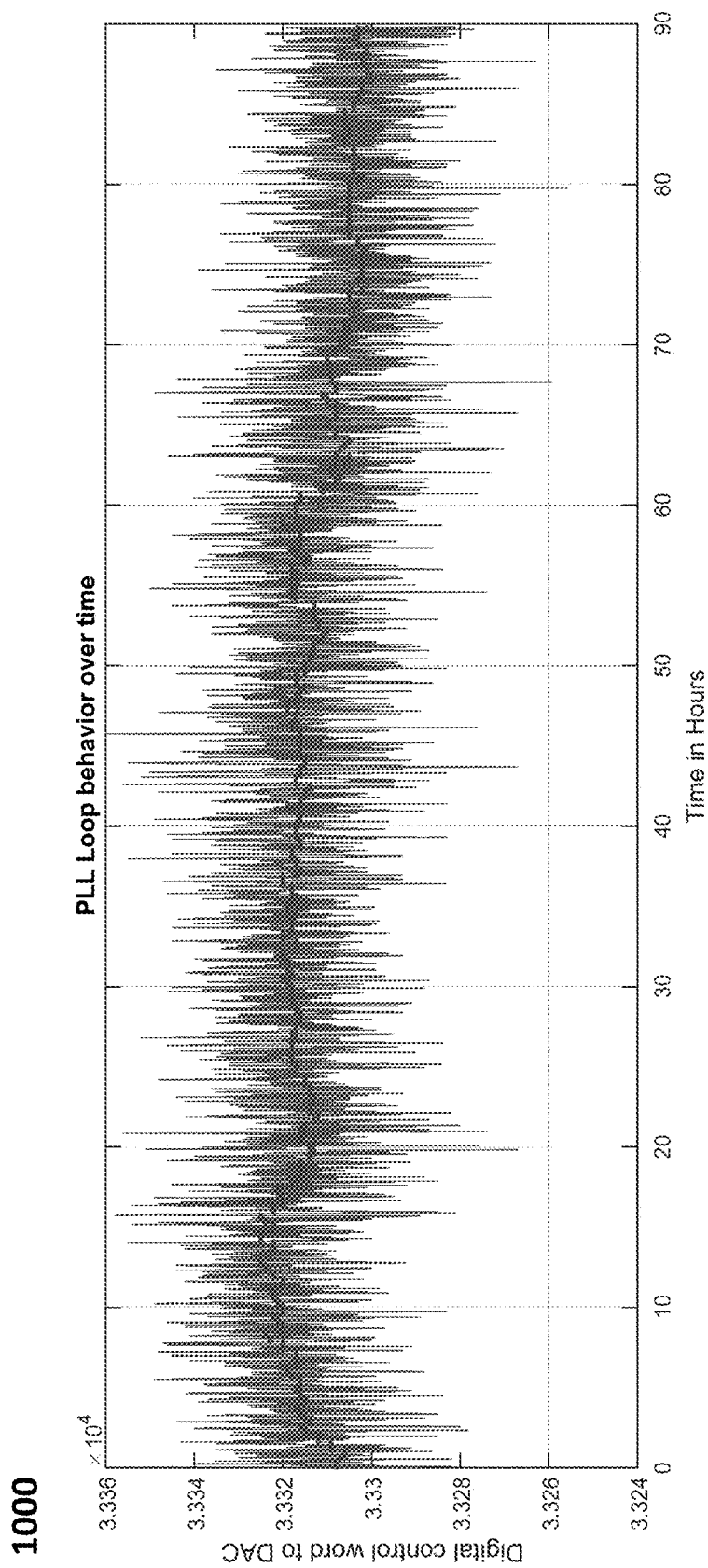
FIG. 10 shows an example of predicted PLL digital control word variations in time.

FIG. 10 shows predicted PLL digital control word variations overlaid on measured PLL digital control word variations shown earlier in FIG. 8. Values of the predicted PLL digital control words may follow the values of actual PLL control words to within an approximately 50 control word deviation as shown in FIG. 10. Therefore, the prediction control logic can enable prediction of control words that allow the oscillator to track its mean frequency in a reliable and accurate manner satisfying the tight timing requirements of the Sirius XM SFN. Even when the GPS receiver fails to receive the GPS signal and is unable to generate the UTC pulse train, the PLL circuit with prediction control logic switches to predicted control voltage values in operating the oscillator and allowing the oscillator to maintain synchronization with the GPS reference signal until the GPS receiver begins to receive the GPS signal again. Using this technique, randomly sampled oscillators maintain the Sirius XM timing requirements for prolonged durations of time. For example, OCXOs with 10 PPB accuracy have maintained the timing requirements for SFNs, such as the Sirius XM, for time durations as high as 4 hours.

Figure 11A:
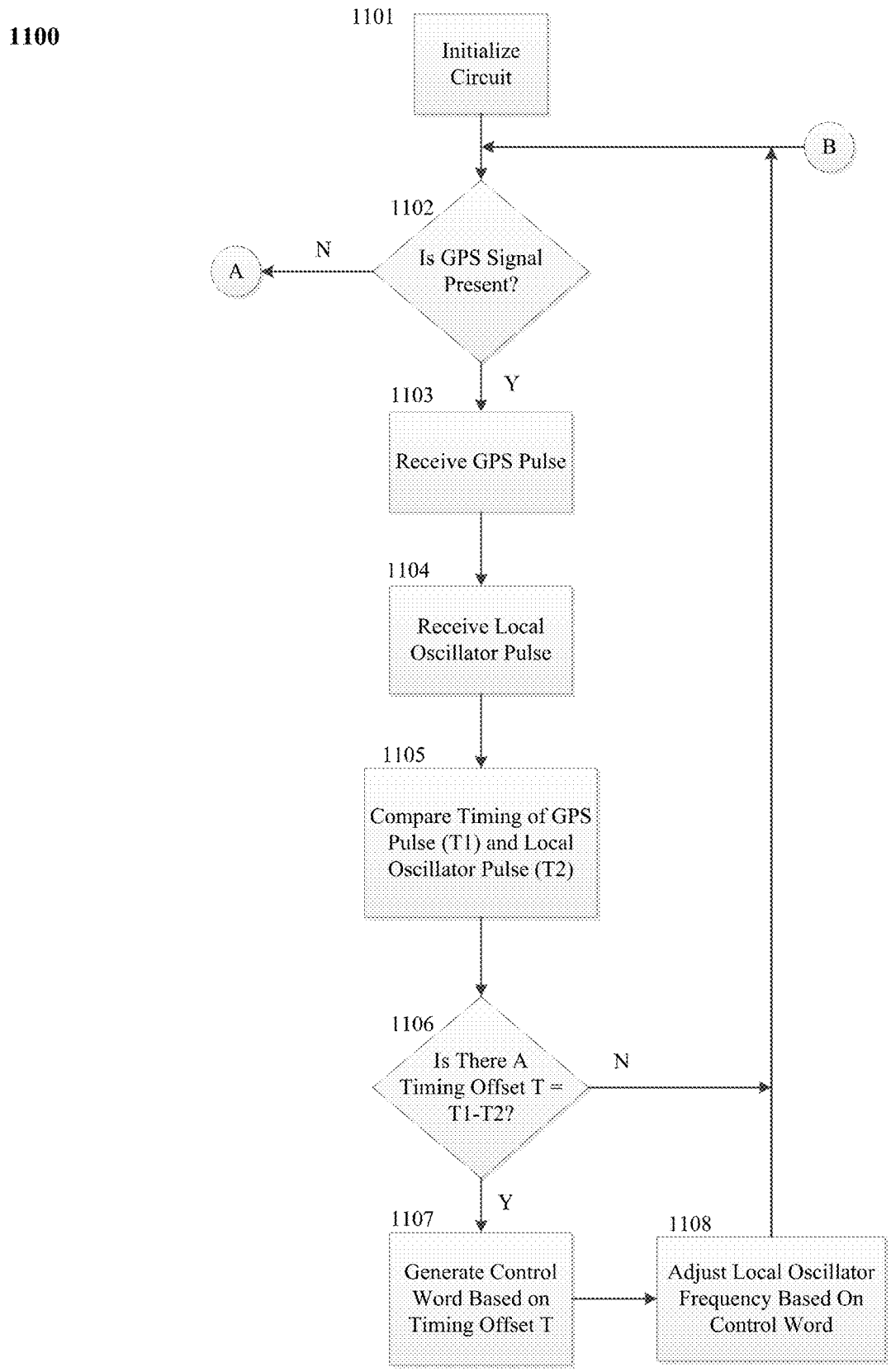
FIGS. 11A-C illustrate an exemplary process flow diagram that may be used for maintaining repeater accuracy in accordance with some embodiments of the present subject matter.
Figure 11B:
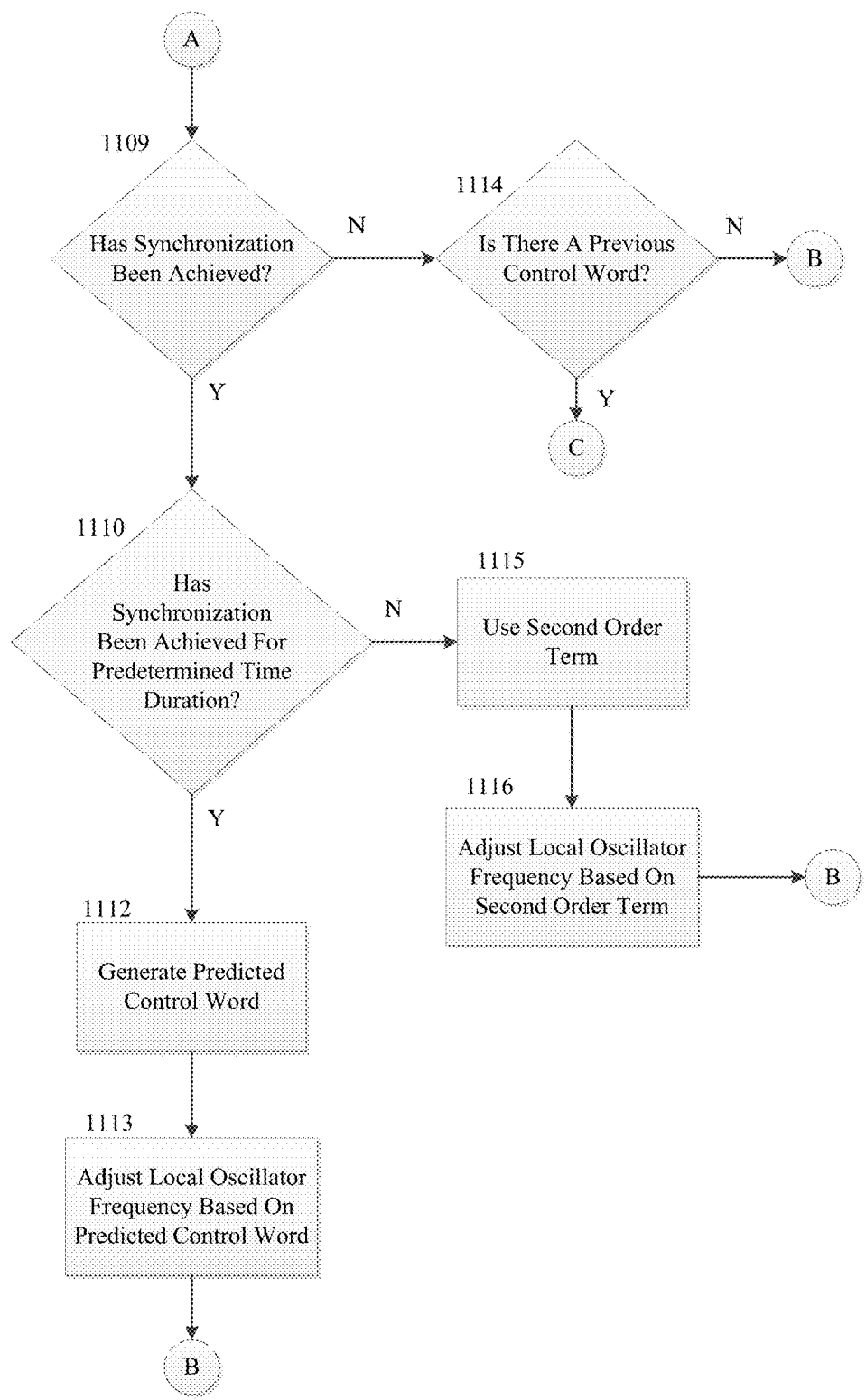
Figure 11C:
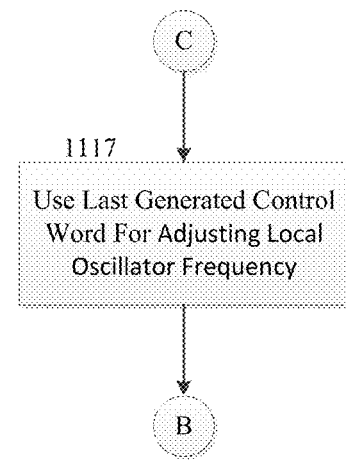

FIGS. 11A-C show an exemplary process flow for maintaining repeater timing accuracies during loss of and/or intermittent GPS signal reception according to some embodiments described herein.

At 1101, the repeater can be initialized and/or powered on. Initialization of the repeater circuits can include setting a predetermined initial control voltage for establishing an initial frequency of the local oscillator. The oven associated with the local oscillator can start heating up to the desired operating temperature (e.g., approximately 75° C.) during this initialization period.

At 1102, the system may determine whether the GPS signal is present. For example, the system can verify whether the GPS receiver is receiving the GPS signal and/or generating the GPS UTC 1 PPS pulse train. If the GPS signal is present, Yes at 1102, the system proceeds to 1103. If no GPS signal is detected, No at 1102, the system proceeds to 1109. The system can use the flywheel detection circuit 904 as described earlier with respect to FIG. 9 in determining presence and/or absence of the GPS signal and generate the corresponding loss of GPS signal 907 for controlling selection of an input at the MUX 915.

At 1103, the system may receive a GPS pulse associated with the GPS receiver output. For example, the system receives a UTC pulse. The system may determine a first position in time, T1, associated with an arrival of the UTC pulse.

At 1104, the system may receive a local pulse from the local oscillator. The system may determine a second position in time, T2, associated with an arrival of the local pulse.

At 1105, the system can compare the first position in time, T1, with the second position in time, T2. For example, the system can calculate a value for T1−T2 and/or T2−T1.

At 1106, the system can determine whether there is a timing offset, T, based on a value of T1−T2 and/or T2−T1 calculated in 1105. In some instances, if a difference in value between T1 and T2 exceeds a predetermined threshold offset, the system may ignore such large offset values that exceed the predetermined threshold offset and continue sampling more GPS pulses by proceeding to 1102. If the difference in value between T1 and T2 does not exceed the predetermined threshold offset, the system may proceed to

1107 for using the difference in value between T1 and T2 in controlling the frequency of the local oscillator.

At 1107, the system may generate a control word, such as the control word 111 in FIG. 1 and the control word 910 in FIG. 9, based on the timing offset determined at 1106. The control word can be sent to a DAC, such as the DAC 103, or to a multiplexer, such as the MUX 915 in FIG. 9. A control signal (e.g., the loss of the GPS signal 907) for the MUX 915 can cause the MUX 915 to use the control word 910, on a first input to the MUX 915, as long as no loss of the GPS signal is detected as shown in FIG. 9. In case there is a loss of the GPS signal, the control signal for the MUX 915 can select a second input to the MUX 915. The second input to the MUX 915 can correspond to the second order term or the predicted control word as described earlier with respect to FIG. 9. An output of the MUX 915 is then sent as an input to the slew control circuit 703. The slew control circuit 703 can be connected to the DAC that generates a control voltage as input to the local oscillator.

At 1108, the system may adjust a frequency of the local oscillator based on the control voltage generated at 1107. For example, the frequency of the local oscillator can be increased or decreased in order to reduce the absolute value of the timing offset T. The system may then proceed to sample a next GPS UTC pulse at 1102.

At 1109, after detecting the loss of the GPS signal at 1102, the system may determine whether synchronization of the local oscillator pulse train with the UTC 1 PPS pulse train has been achieved. If the local oscillator pulse train has not synchronized with the UTC 1 PPS pulse train yet, No at 1109, the system may proceed to 1114 described later. If the local oscillator pulse train is synchronized with the UTC 1 PPS pulse train, Yes at 1109, the system may proceed to 1110.

At 1110, the system may determine whether the synchronization has been maintained for at least a predetermined duration of time. For example, if the system determines that the local oscillator pulse train has maintained synchronization with the UTC 1 PPS pulse train for at least the predetermined duration of time, such as 4 hours, Yes at 1110, the system may proceed to 1112. If the system determines that the local oscillator pulse train has not maintained synchronization with the UTC 1 PPS pulse train for at least the predetermined duration of time, such as 4 hours, No at 1110, the system may proceed to 1115 described later. If synchronization has not been maintained for a sufficient duration of time, the system may not have stored sufficient data associated with the generation of control words and/or a behavior of the GPS receiver.

At 1112, the system uses data associated with historically generated control words for generating a predicted control word. The historically generated control words can include a plurality of control words stored in a memory of the system over a time duration that satisfies the predetermined duration of time. A linear fit can be performed on values associated with the historically generated control words for generating the predicted control word.

At 1113, the system adjusts a frequency of the local oscillator based on the predicted control word. For example, the predicted control word can cause the local oscillator frequency to track an expected frequency of the GPS signal and/or maintain timing accuracies of the repeaters across the SFN.

At 1114, after determining that the local oscillator pulse train has not synchronized with the UTC 1 PPS pulse train in 1109, the system may determine whether a previously generated control word is stored in the memory. If the system locates and retrieves the previously generated control word from the memory, Yes at 1114, the system may proceed to 1117. If the system fails to locate and/or retrieve the previously generated control word, No at 1114, the system may proceed to 1102 and verify whether GPS signal reception has re-started and/or GPS signal reception is successful for sampling a next UTC pulse.

At 1115, after the system has determined that the local oscillator pulse train has not maintained synchronization with the UTC 1 PPS pulse train for at least the predetermined duration of time, such as 4 hours, No at 1110 described earlier, the system may use the second order term as a control word input to the slew control circuit 703.

At 1116, the system may adjust the local oscillator frequency based on the second order term. For example, the second order term functions as an input to the slew control circuit 703 which in turn can be connected to the DAC for generating the control voltage input to the local oscillator. Variations in the control voltage input to the local oscillator can vary the local oscillator frequency and cause the adjusted local oscillator frequency to maintain synchronization with the GPS UTC pulses. The system can then proceed to 1102 and proceed to sample a next GPS UTC pulse.

At 1117, after locating and retrieving the previously generated control word from the memory, Yes at 1114, the system may use the previously generated control word for adjusting the local oscillator frequency. For example, the adjusted local oscillator frequency can maintain tight timing accuracies and/or continue to maintain synchronization with the GPS UTC pulses. The system may then proceed to 1102 to determine whether GPS signal reception has resumed.

Although the exemplary implementation discussed above involves a system with a GPS receiver receiving an intermittent GPS signal and a PLL locking onto an output of the GPS receiver, the present subject matter can be implemented in any SFN that relies on locking onto an intermittent reference frequency for maintaining timing accuracies.

The invention claimed is:

1. A method comprising:
receiving, by a computing system, a Global Positioning System (GPS) signal;
synchronizing, by the computing system, a local reference signal with the GPS signal based on a plurality of control words;
determining, by the computing system, an amount of time during which the local reference signal was synchronized with the GPS signal; and
after identifying an interruption in the GPS signal, generating a predicted control word based on the plurality of control words and based on the amount of time satisfying a first predetermined time duration;
wherein the generating the predicted control word comprises: generating, based on the plurality of control words, a linear curve fit.

2. The method of claim 1, further comprising:
maintaining, by the computing system and via a feedback path, synchronization of the local reference signal with the GPS signal based on the predicted control word.

3. The method of claim 2, further comprising:
controlling, based on the predicted control word, a slew voltage; and
adjusting, via the feedback path, a frequency of the local reference signal based on the slew voltage.

4. The method of claim 1, further comprising:
determining, by the computing system, that the amount of time during which the local reference signal was synchronized with the GPS signal satisfies a second predetermined time duration less than the first predetermined time duration;

generating, by the computing system and based on the plurality of control words, a second order estimate of the predicted control word; and maintaining, by the computing system, synchronization of the local reference signal with the GPS signal based on the second order estimate of the predicted control word.

5. The method of claim 1, further comprising:

after the determining the interruption in the GPS signal, determining, an absence of synchronization of the local reference signal with the GPS signal; and adjusting a frequency of the local reference signal based on a most recent control word of the plurality of control words.

6. The method of claim 5, further comprising:

maintaining synchronization of the local reference signal with the GPS signal based on the adjusted frequency of the local reference signal.

7. A system comprising:

a Global Positioning System (GPS) receiver configured to generate a GPS signal; and a computing device including:
   at least one processor; and
   memory storing computer-readable instructions that, when executed by the at least one processor, cause the computing device to:
      receive, from the GPS receiver, the GPS signal;
      synchronize a local reference signal with the GPS signal based on a plurality of control words;
      determine an amount of time during which the local reference signal was synchronized with the GPS signal; and
      after identifying an interruption in the GPS signal, generate a predicted control word based on the plurality of control words and based on the amount of time satisfying a first predetermined time duration;

wherein the generating the predicted control word comprises: generating, based on the plurality of control words, a linear curve fit.

8. The system of claim 7, the memory further storing computer-readable instructions that, when executed by the at least one processor, cause the computing device to:

maintain, via a feedback path, synchronization of the local reference signal with the GPS signal based on the predicted control word.

9. The system of claim 7, the memory further storing computer-readable instructions that, when executed by the at least one processor, cause the computing device to:

control, based on the predicted control word, a slew voltage; and adjust, via the feedback path, a frequency of the local reference signal based on the slew voltage.

10. The system of claim 7, the memory further storing computer-readable instructions that, when executed by the at least one processor, cause the computing device to:

determine that the amount of time during which the local reference signal was synchronized with the GPS signal satisfies a second predetermined time duration less than the first predetermined time duration;

generate, based on the plurality of control words, a second order estimate of the predicted control word; and maintain synchronization of the local reference signal with the GPS signal based on the second order estimate of the predicted control word.

11. The system of claim 7, the memory further storing computer-readable instructions that, when executed by the at least one processor, cause the computing device to:

after the determining the interruption in the GPS signal, determine an absence of synchronization of the local reference signal with the GPS signal; and adjust a frequency of the local reference signal based on a recent control word of the plurality of control words.

12. The system of claim 11, the memory further storing computer-readable instructions that, when executed by the at least one processor, cause the computing device to:

maintain synchronization of the local reference signal with the GPS signal based on the adjusted frequency of the local reference signal.

13. A method comprising:

synchronizing, by the computing system and based on a plurality of control words, a local signal with a Global Positioning System (GPS) signal;

detecting, by the computing system, a loss of the GPS signal;

determining that the local signal was synchronized with the GPS signal before the loss of the GPS signal;

continuing to maintain synchronization, by the computing system, between the local signal and the GPS signal based on the plurality of control words and based on adjusting a frequency of the local signal;

wherein the generating the predicted control word comprises: generating, based on the plurality of control words, a linear curve fit.

14. The method of claim 13, further comprising:

determining that the local signal was not synchronized with the GPS signal before the loss of the GPS signal;

determining a most recent control word of the plurality of control words; and adjusting a frequency of the local signal based on the most recent control word.

15. The method of claim 13, wherein the adjusting the frequency of the local signal is based on:

determining an amount of time corresponding to a generation of the plurality of control words;

determining that the amount of time satisfies a predetermined duration of time; and generating a predicted control word based on the plurality of control words.

16. The method of claim 13, wherein the adjusting the frequency of the local signal is based on:

determining an amount of time corresponding to a generation of the plurality of control words;

determining that the amount of time does not satisfy a predetermined duration of time; and generating a second order word based on the plurality of control words, wherein the second order word corresponds to an average value associated with the plurality of control words.

17. The method of claim 13, wherein the plurality of control words are generated based on:

detecting a plurality of timing offsets between the GPS signal and the local signal.

* * * * *